United States Patent [19]

Leidinger

[11] Patent Number: 5,271,454
[45] Date of Patent: Dec. 21, 1993

[54] METHOD AND APPARATUS FOR REMOVING HEAT GENERATED IN A SPACECRAFT

[75] Inventor: Bernhard Leidinger, Weyhe-Leeste, Fed. Rep. of Germany

[73] Assignee: Erno Raumfahrttechnik GmbH, Bremen, Fed. Rep. of Germany

[21] Appl. No.: 940,505

[22] Filed: Sep. 4, 1992

[30] Foreign Application Priority Data

Sep. 14, 1991 [DE] Fed. Rep. of Germany ....... 4130694
Jan. 14, 1992 [DE] Fed. Rep. of Germany ....... 4200688

[51] Int. Cl.$^5$ ............................................... F25D 7/00
[52] U.S. Cl. ..................... 165/41; 165/110; 165/143; 165/911; 62/526; 62/268; 244/163
[58] Field of Search .................. 165/41, 143, 110, 911; 62/526; 244/163

[56] References Cited

U.S. PATENT DOCUMENTS

3,090,210 12/1919 Groff ..................................... 62/526

FOREIGN PATENT DOCUMENTS

3718873 11/1988 Fed. Rep. of Germany .

OTHER PUBLICATIONS

Article entitled: "Hermes Thermal Control Design and Architecture", by M. Bottacini et al.; 21st ICES-Conference, 1991, SAE 911 499, p. 12.

Primary Examiner—Albert W. Davis, Jr.
Attorney, Agent, or Firm—W. G. Fasse

[57] ABSTRACT

Heat is removed from a spacecraft under zero gravity and under various accelerations, by a heat exchange contact between a cooling liquid or coolant and an evaporant or medium to be evaporated. The coolant flowing in at least one liquid cooling circulation circuit and the evaporant which is discharged in its vapor phase, are brought into heat exchange contact with each other in processing chambers forming at least two separate heat exchange stages, wherein different pressure and temperature conditions are set. The cooling liquid or coolant and the medium to be evaporated evaporant flow through these stages in sequence and in such a way that the coolant first flows through the stage with the highest pressure and the highest temperature, and then flows through the stages with successively lower pressure and/or temperature.

9 Claims, 2 Drawing Sheets

METHOD AND APPARATUS FOR REMOVING HEAT GENERATED IN A SPACECRAFT

CROSS REFERENCE TO RELATED APPLICATIONS

The present application relates to U.S. Ser. No.: 07/940,470, filed on Sep. 4, 1992; by Bernhard Leidinger, entitled: "EVAPORATION HEAT EXCHANGER APPARATUS FOR REMOVING HEAT", and to U.S. Ser. No. : 07/940,470, filed on Sep. 4, 1992; by Bernhard Leidinger, entitled: "EVAPORATION HEAT EXCHANGER APPARATUS FOR REMOVING HEAT".

FIELD OF THE INVENTION

The invention relates to a method and to an apparatus for removing heat generated in a spacecraft under zero gravity conditions and at different accelerations.

BACKGROUND INFORMATION

In spacecraft that are in the take-off or landing phase through the earth's atmosphere, or spacecraft exposed to extreme thermal stress in orbit around the earth, it is necessary that the generated heat is safely and reliably removed. Evaporation heat exchangers are employed for this purpose.

The basic principle of operation of such heat exchangers lies in that, the medium to be cooled, referred to herein as coolant, circulates in an active liquid circulating circuit for the heat removal, by bringing the coolant into heat transferring contact with a medium to be evaporated, which is stored in a supply container. The evaporated medium in the form of vapor is then discharged out of the spacecraft into the surroundings.

In order to optimally use the medium to be evaporated the evaporation must be as complete as possible, whereby it is important to ensure as good a thermal contact as possible for the heat transfer between the cooling liquid and the medium to be evaporated.

In a conventional heat exchanger described, for example, in German Patent Publication DE-PS 3,718,873, (Muschelknautz et al.), published on Nov. 10, 1988, the cooling liquid or rather coolant flows through individual channels extending through a processing or heat exchange space, into which the medium to be evaporated is sprayed in droplet form through an inlet valve. In a second conventional evaporation heat exchanger, the cooling liquid or coolant flows openly through the processing space, while the medium to be evaporated is caused to flow through individual channels usually arranged in bundles passing through the heat exchange space. The cooling liquid is, in addition, forced into a meandering flow path through screens arranged in the processing space.

An evaporation heat exchanger of the immediately aforementioned type is described in an article: "HERMES Thermal Control Design And Architecture", by M. Bottacini, A. Moscatelli, and C. Ferro, 21st ICES-Conference, 1991, SAE 911 499, p. 12. This conventional heat exchanger requires that, independent of the heat load causing thermal stress to be removed, which in the case described in the above article can vary between 30 and 100% of the maximum load, the discharge temperature of the coolant, e.g. water, at the exit of the coolant circulating circuit is constant at 6° C.

The liquid to be evaporated in said conventional heat exchanger is liquid ammonia ($NH_3$), that is led from a respective supply container through a spraying system into the evaporator. After evaporation the vapor is blown out into the surroundings. The temperature of the ammonia in the supply container has a temperature between 0° C. and 70° C. and the pressure in the supply container corresponds to either the saturation pressure or it is increased by pressurizing the tank with nitrogen or helium gas.

Upon injection of the liquid ammonia into the evaporator, the pressure in the supply tank is drastically reduced. Therefore, directly behind the injection valve, as much ammonia is evaporated as is necessary for bringing the injected liquid to the saturation temperature prevailing downstream of the valve. This temperature is a function of the pressure in the evaporator.

Without special technical equipment, the pressure in the evaporator depends only on the following, namely the absolute pressure of the surroundings, into which the evaporated ammonia is released, the pressure loss of the mass flow of ammonia through the outlet channel, and on pressure jumps at ring cross-sections in the outlet channel.

The ammonia temperature that develops during the adiabatic evaporation must always be colder than the water temperature, so that heat from the coolant circulation circuit can be taken up. However, the evaporation temperature under any circumstances must not be so low that local freezing takes place in the surface or interface layer of the water current or flow.

Since such heat exchangers should work in a vacuum (at about 600 Pa) as well as at normal atmospheric pressure (101.3 kPa) and since various sizes of ammonia vapor streams or flows are generated, due to the wide load spectrum, the evaporation pressure, and therefore also the evaporation temperature vary depending on the load and on the mission to be performed. The evaporation temperature is the highest at a full load and the lowest at a partial load.

To regulate or control the ammonia evaporation pressure and the temperature in closed loop fashion, the above article by Bottacini et al. suggests providing an inlet pressure regulating valve on the inlet side where the medium to be evaporated enters the heat exchange system, whereby the pressure in the evaporation space or chamber can be held constant independently of the generated vapor mass flow and also independent of the pressure of the surroundings, e. g. in space.

Since such an inlet pressure regulating valve is a mechanical component, in which a failure can never be completely ruled out, it would be necessary to meet redundance requirements to provide at least one more valve. In fact, an additional parallel line with two more valves or three additional valves, would be needed. However, such an arrangement of a total of four valves means a substantial increase in expenditure, mass and volume, which is not desirable in a spacecraft.

OBJECTS OF THE INVENTION

In view of the foregoing it is the aim of the invention to achieve the following objects singly or in combination:

to develop a cooling method for spacecraft which achieves the desired cooling in a simple manner without additional mechanical elements, by keeping the evaporation temperature of the medium to be evaporated so low and independent of load and opposing pressure, that the necessary amount of heat can be removed, while simultaneously holding the evaporation temperature high enough so that freezing of the coolant, especially along interface layers between the coolant and the components holding the medium to be evaporated, is avoided;

to develop and provide a cooling apparatus for carrying out such a method; and to perform the present method in several stages so that the coolant which has taken up heat, passes these stages with sequentially decreasing temperatures and/or decreasing pressures.

SUMMARY OF THE INVENTION

According to the invention the first object is achieved by performing the heat exchange in at least two spatially separated stages, with different pressure and temperature conditions, and therefore under different resulting load spectra. For this purpose the coolant and the evaporating medium or evaporant are caused to flow in such a way that the coolant first enters a chamber with the highest pressure and highest temperature and then the pressure and/or temperature decrease from stage to stage.

It is advantageous and preferable that the medium to be evaporated and the coolant flow through these stages in opposite sequence, that is to say, the medium to be evaporated first comes into the stage in which the cooling liquid was last cooled and flows last through the stage in which the cooling liquid was first cooled.

It is further advantageous to use liquid ammonia ($NH_3$) or hydrogen ($H_2$) as the medium to be evaporated, and water as the coolant in practicing the method of the invention. For special mission requirements, it is especially advantageous in connection with the method of the invention, if the pressure and temperature conditions are chosen so that in one stage, preferably in the outlet stage for the coolant or cooling liquid, the medium to be evaporated only partially evaporates. The medium to be evaporated will be referred to also as evaporant.

The apparatus of the invention has at least two spatially separated, operatively interconnected stages in which the pressure and temperature control is such that each stage has a different pressure and temperature, to achieve the second object.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
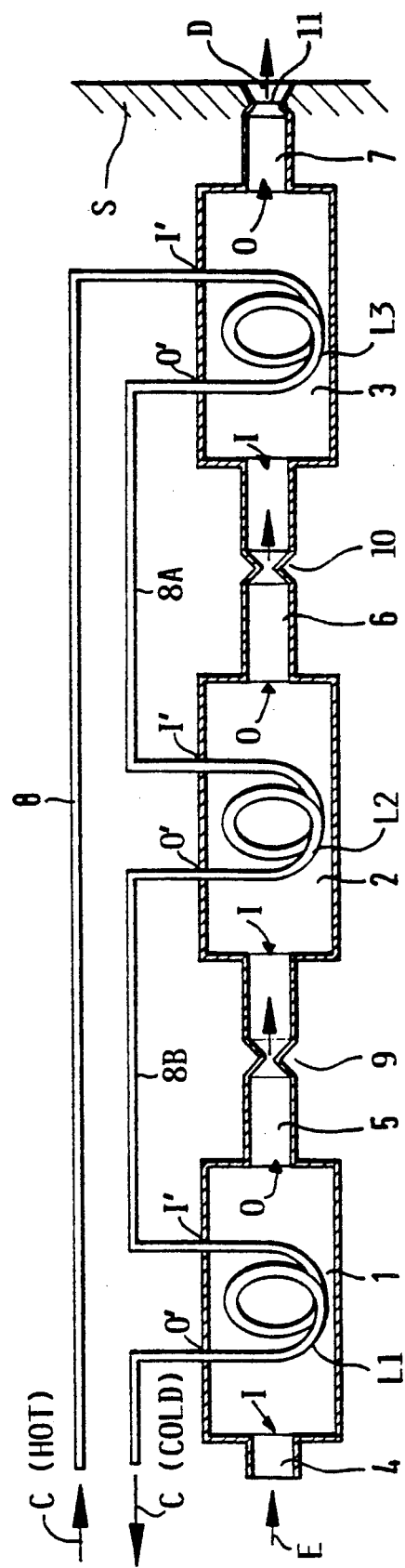
FIG. 1 shows a three chamber, three stage system of the invention with counter current flows.
Figure 2:
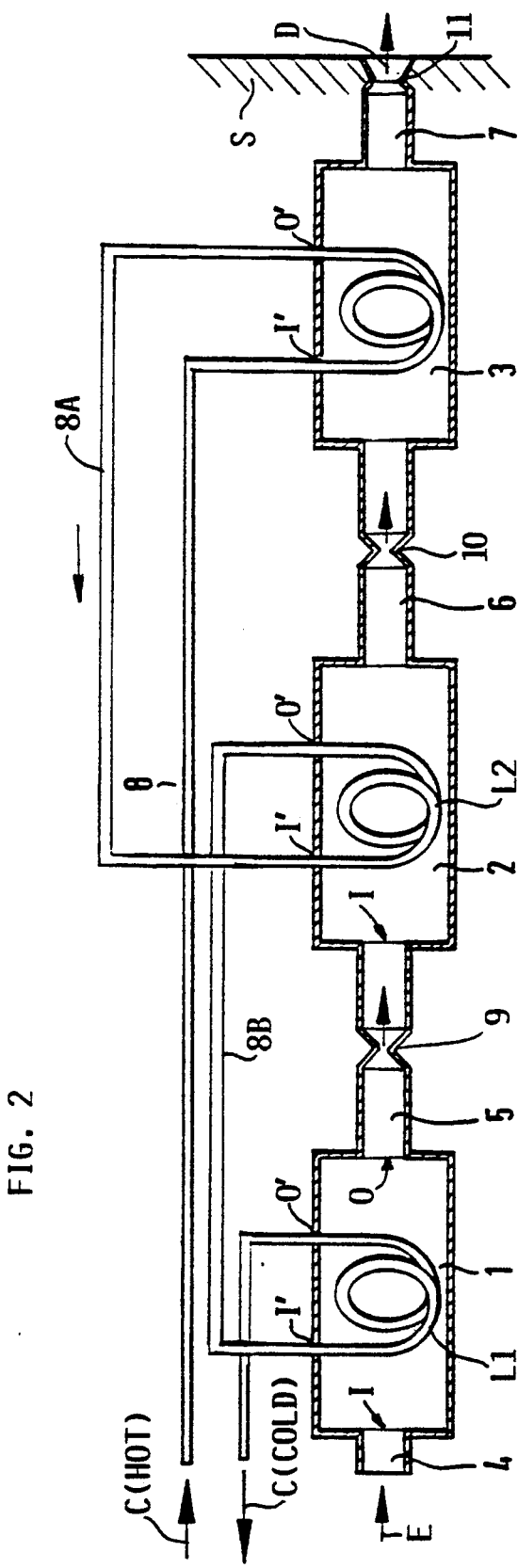
FIG. 2 shows the present three stage system, wherein coolant and evaporant are flowing approximately in the same direction in the respective chamber.

FIGS. 1 and 2 show a principle illustration of a three stage evaporation heat exchanger of the invention, comprising, for example, three separate chambers 1 to 3, which are arranged in a common frame that is part of the spacecraft S. Details of the frame are not shown. The physical construction of the individual chambers 1, 2, 3, .. may be arranged as described in the above mentioned German Patent Publication 3,718,873 (Muschelknautz et al.). Accordingly, bundles of small diameter pipes running lengthwise in each of the cylindrical chambers 1 to 3 are connected to a common inlet I and to a common outlet O through which the medium to be evaporated or the evaporant, e.g. ammonia, flows from left to right through the pipes to the discharge port D as indicated by the open arrows. The surfaces of these pipes carrying the evaporating medium are in direct heat exchange contact with the coolant, which in this example is water. The water enters its cooling coil in each chamber 1, 2, 3 at I' and exits at O'.

The medium E to be evaporated or the evaporant E is sprayed into the chamber 1 forming the first stage of the heat exchanger through an inlet valve 4 and flows through the small diameter pipes of this first chamber 1 and into the chamber 2 through a connecting duct 5 and through a flow cross-sectional area reducing device or restrictor 9 in the duct 5. From the chamber 2 of the second stage the evaporating medium E flows through a second connecting duct 6 into chamber 3 of the last stage. The completely evaporated liquid now flows as vapor through an outlet 7 and the discharge port D into the environment.

The coolant C, such as water, flows through a loop 8 depicted as a continuous, uninterrupted loop 8 with loop sections L1, L2, and L3 in the respective chambers 1, 2, 3. These loop sections L1, L2, L3 are a symbolic representation of the fact that the coolant C passes through each stage in sequence in heat exchange contact with the evaporant. The hot coolant C is first caused to flow into the loop section L3 in the chamber 3 forming the third stage connected to the outlet 7 for discharging the vapor preferably through a restrictor 11. The coolant C washes over the pipes carrying the medium E to be evaporated, and next flows into the chamber 2 through a connecting pipe 8A through the loop section L2, through a connecting pipe 8B into the loop section L1 in the chamber 1. The now cold coolant C is led back to the components of the spacecraft to be cooled down to the desired temperature. The complete pipe system for the cooling liquid or coolant has not been shown in the figures, in order to have a better overview. As mentioned, the detail construction of the chambers 1, 2, 3 may be as disclosed in German Patent Publication 3,718,873.

In FIG. 1, coolant C and evaporant E have an approximately counter-current flow relationship in each chamber. In FIG. 2 coolant and evaporant flow approximately in the same direction in each chamber.

Assuming that the cooling liquid or coolant C entering the chamber 3 (third stage) has a temperature between 24° and 65° C., and that it should leave chamber 1 (first stage) with a temperature of 6° C., the necessary values of ammonia pressure for this cooling can be estimated from the vapor pressure curve, if it is further assumed that the temperature of the ammonia must lie below that of the cooling liquid that is to be cooled. Based on these assumptions the pressure in the first stage (chamber 1) should be in the range between 355 kPa and about 516 kPa. Since this pressure lies substantially above the maximum pressure of the surroundings, it is advantageous to arrange a flow restrictor 9 in the connecting pipe 5 for controlling the pressure, and to keep the volume flow of the medium to be evaporated approximately constant through the pipe 5. This means, however, that in chamber 1 always the same amount of heat is exchanged, which is why this first stage is laid out for the smallest partial load, with an entrance temperature of the cooling liquid or coolant C into the loop section L1 in chamber 1 (first stage) of about 24° C.

For the second stage in chamber 2, in which there are only water or coolant temperatures above, 24° C., there are a maximum temperature of the cooling liquid or coolant C of 35° C. and a minimum pressure for the medium to be evaporated or evaporant E of about 160 kPa. Since the pressure in the first stage should not exceed 516 kPa, the pressure in the second stage may have a maximum pressure of about 280 kPa.

Finally, in the third and last stage, upstream of which there is arranged a further stream restrictor 10, the cooling liquid is cooled down from its maximum entrance temperature of 65° C. to about 35° C. On the basis of this temperature a pressure between 47 and 150 kPa for the medium to be evaporated E is calculated for chamber 3.

It is to be understood that the foregoing temperature and pressure ranges are to be taken as approximate guide values, which were estimated under the assumption, that the heat transfer coefficients are about equal on the side of the cooling liquid or coolant C and on the side of the medium to be evaporated E. Under the assumption of especially preferable operating conditions it is possible that a two-stage construction may be adequate to achieve the function of such an evaporation heat exchanger, namely to cool down the cooling liquid or coolant C to a constant temperature of 6° C. and to completely transfer the medium E to be evaporated into the vapor phase, which is in the scope of the invention.

Although the invention has been described with reference to specific example embodiments it will be appreciated that it is intended to cover all modifications and equivalents within the scope of the appended claims.

What I claim is:

1. A method for removing heat from a spacecraft under zero gravity conditions and under different acceleration conditions, wherein a coolant flowing in at least one coolant circulation circuit and an evaporant are brought into heat exchange contact with each other, comprising the following steps:
   (a) connecting at least two heat exchange stages in series with each other and establishing a flow of evaporant through said heat exchange stages;
   (b) passing said flow of evaporant through a flow restriction (9) between said heat exchange stages for maintaining different evaporation pressures and different evaporation temperatures in said at least two heat exchange stages for operation under said conditions in said spacecraft;
   (c) passing hot coolant first into an evaporant discharge stage having the highest evaporation temperature which is cooler than said hot coolant and the higher evaporant pressure and then passing said coolant sequentially through stages with successively lower evaporant pressure and evaporant temperatures, whereby cooler evaporant takes up heat from said coolant in each stage and cooled coolant exits from a stage into which the evaporant enters first; and
   (d) discharging a vapor phase of said evaporant from said evaporant discharge stage, whereby said coolant and said evaporant flow through individual stages in opposite sequences.

2. The method of claim 1, wherein said coolant is water.

3. The method of claim 1, wherein said evaporant is ammonia ($NH_3$).

4. The method of claim 1, wherein the pressure and temperature conditions in said stages and the evaporant are so chosen that only a partial evaporation of the evaporant takes place in any one stage.

5. The method of claim 1, wherein said evaporant is liquid hydrogen ($H_2$).

6. The method of claim 1, wherein inside each stage a main flow direction of said coolant is approximately opposite to a main flow direction of the evaporant (FIG. 1).

7. The method of claim 1, wherein inside each stage a main flow direction of said coolant is approximately the same as a main flow direction of evaporant (FIG. 2).

8. An apparatus for removing heat from a spacecraft under zero gravity and different acceleration conditions, wherein a coolant (C) flowing in at least one coolant circulation circuit and an evaporant (E) are brought into heat exchange contact, comprising at least two separate heat exchange chambers (1, 2, 3), duct means (5, 6) interconnecting said heat exchange chambers in series with each other for passing said evaporant (E) through said chambers from a first chamber to a last chamber, at least one flow restrictor (9, 10) in at least one of said duct means (5, 6), means for introducing said evaporant (E) into a first chamber (1), means for discharging vapor of said evaporant from a last chamber (3), means for passing said coolant (C) sequentially through said chambers from said last chamber to said first chamber, and wherein said flow restrictor maintains said chambers at different temperature and pressure operating conditions, whereby in each stage an evaporant temperature is cooler than a coolant temperature in the respective stage and coolant and evaporant flow through individual stages in opposite sequences.

9. The apparatus of claim 8, wherein said evaporant flows through small diameter pipes installed in said chambers, and wherein said coolant is caused to flow in contact with an outer surface of said small diameter pipes.

* * * * *

UNITED STATES PATENT AND TRADEMARK OFFICE
CERTIFICATE OF CORRECTION

PATENT NO. : 5,271,454
DATED : December 21, 1993
INVENTOR(S) : Bernhard Leidinger It is certified that error appears in the above-identified patent and that said Letters Patent is hereby corrected as shown below:

Column 1, line 11, replace "U.S. Ser. No.: 07/940,470" by --U.S. Ser. No.: 07/940,471--;

Column 5, line 55, replace "higher" by --highest--;

Column 6, line 19, replace "claim 1" by --claim 4--.

Signed and Sealed this

Seventeenth Day of May, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,271,454
DATED : December 21, 1993
INVENTOR(S) : Bernhard Leidinger It is certified that error appears in the above-identified patent and that said Letters Patent is hereby corrected as shown below:

Column 1, line 11, replace "U.S. Ser. No.: 07/940,470" by --U.S. Ser. No.: 07/940,471--;
Column 5, line 55, replace "higher" by --highest--;
Column 6, line 19, replace "claim 1" by --claim 4--.

This certificate supersedes Certificate of Correction issued May 17, 1994.

Signed and Sealed this

Second Day of August, 1994

*Attest:*

BRUCE LEHMAN

*Attesting Officer*  Commissioner of Patents and Trademarks